US011487369B2

(12) United States Patent
Fang et al.

(10) Patent No.: US 11,487,369 B2
(45) Date of Patent: Nov. 1, 2022

(54) TOUCH PANEL HAVING DUMMY PATTERN

(71) Applicant: TPK Advanced Solutions Inc., Fujian (CN)

(72) Inventors: Qin-Xue Fang, Xiamen (CN); Xiang-Xing Xu, Xiamen (CN); Yong-Bin Ke, Xiamen (CN); Yi-Peng Gan, Xiamen (CN); Li-Huang Tsai, Miaoli County (TW)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/224,582

(22) Filed: Apr. 7, 2021

(65) Prior Publication Data

US 2021/0318768 A1    Oct. 14, 2021

(30) Foreign Application Priority Data

Apr. 14, 2020 (CN) .......................... 202010289650.8

(51) Int. Cl.
*G06F 3/041* (2006.01)
*G02F 1/1333* (2006.01)

(52) U.S. Cl.
CPC .......... *G06F 3/041* (2013.01); *G02F 1/13338* (2013.01)

(58) Field of Classification Search
CPC ........... G06F 3/041; G06F 2203/04112; G06F 3/0445; G06F 3/0448; G02F 1/13338
See application file for complete search history.

(56) References Cited

U.S. PATENT DOCUMENTS

2016/0179259 A1*  6/2016  Watanabe ............. G06F 3/0445
                                                        345/174

* cited by examiner

*Primary Examiner* — Adam R. Giesy
(74) *Attorney, Agent, or Firm* — Cooper Legal Group, LLC

(57) ABSTRACT

A touch panel having dummy pattern is provided, including a first metal nanowire layer and a second metal nanowire layer. The first metal nanowire layer includes first electrode wires, first axial wires connected to the first electrode wires, and first dummy patterns. The second metal nanowire layer includes a plurality of second electrode wires and a plurality of second axial wires connected to the second electrode wires. The first dummy patterns are electrically insulated and deposited outside the first electrode wires and the first axial wires, and each of the first dummy patterns comprises a plurality of first etching areas extending along the first and second directions. The first dummy patterns do not expose the first etching areas along the first direction at a vertical projection area of a part where each of the second axial wires alone exists, so that the electrode pattern is difficult to observe.

20 Claims, 5 Drawing Sheets

TOUCH PANEL HAVING DUMMY PATTERN

CROSS-REFERENCE TO RELATED APPLICATION

This application claims priority to China Application Serial Number 202010289650.8, filed on Apr. 14, 2020, which is herein incorporated by reference in its entirety.

BACKGROUND

Field of Disclosure

The present disclosure relates to a touch panel. More particularly, the present disclosure relates to a touch panel having a dummy pattern.

Description of Related Art

With the technical development in recent years, touch panels have been widely used in various electronic devices. The touch panel is widely used as a substitute for input such as a mouse or keyboard, and the touch panel is convenient for users to input information directly on the panel with a finger or pen.

Generally, the touch panel is provided on the outer surface of a display device such as a liquid crystal display device or an organic light emitting display device to provide a touch function. In other words, the touch panel is closer to the user than the display device. Therefore, the optical effect of the touch panel will affect the display visual effect of the entire electronic device. In terms of design, the electrode material, electrode pattern, and laminated structure of the touch panel will affect the optical effect of the touch panel.

Therefore, how to design the electrode pattern that is not easy to observe and improves the optical effect of the touch panel needs to be studied, and the existing technology needs to be improved.

SUMMARY

The present disclosure provides a touch panel having a dummy pattern. The design of the dummy pattern significantly reduces the visibility of the electrode pattern of the double electrode layers.

The present disclosure provides the touch panel having dummy pattern, including a first metal nanowire layer and a second metal nanowire layer. The first metal nanowire layer includes a plurality of first electrode wires, a plurality of first axial wires, and a plurality of first dummy patterns. The first electrode wires extend along a first direction and are spaced apart from each other along a second direction, wherein the first direction is perpendicular to the second direction. The first axial wires extend along the second direction and are spaced apart from each other along the first direction, and each of the first axial wires is connect to the first electrode wires. The first dummy patterns are electrically insulated and disposed in areas other than the first electrode wires and the first axial wires, and each of the first dummy patterns includes a plurality of first etching areas respectively extending in the first direction and the second direction. The second metal nanowire layer is electrically insulated and disposed above or below the first metal nanowire layer, and the second metal nanowire layer includes a plurality of second electrode wires and a plurality of second axial wires. The second electrode wires extend along the second direction and are spaced apart from each other along the first direction. The second axial wires extend along the first direction and are spaced apart from each other along the second direction, and each of the second axial wires is connected to the second electrode wires. The first dummy patterns do not expose the first etching areas along the first direction at a vertical projection area of a part where each of the second axial wires alone exists.

In some embodiments, each of the first etching areas extending along the first direction is disposed at a vertical projection area of an intersection of each of the second electrode wires and each of the second axial wires, and the vertical projection area of the intersection of each of the second electrode wires and each of the second axial wires is projected on the first dummy patterns.

In some embodiments, the first dummy patterns further comprise a plurality of first dummy subpatterns separated by the first etching areas.

In some embodiments, in the first dummy patterns, an area of each of the first dummy subpatterns at least partially overlapping a vertical projection area of the second axial wires is larger than an area of each of the other first dummy subpatterns.

In some embodiments, the each of first etching areas is in a stripe shape, and a width of the stripe shape is from 15 μm to 25 μm.

In some embodiments, the first etching areas extending along the first direction are spaced apart from each other along the second direction, the first etching areas extending along the second direction are spaced apart from each other along the first direction, and a distance between two adjacent first etching areas in the first direction or in the second direction is greater than a width of each of the second axial wires.

In some embodiments, the second metal nanowire layer comprises a plurality of second dummy patterns electrically insulated and disposed in areas other than the second electrode wires and the second axial wires, and each of the second dummy patterns comprises a plurality of second etching areas respectively extending in the first direction and the second direction.

In some embodiments, the second dummy patterns do not expose the second etching areas along the second direction at a vertical projection area of a part where each of the first axial wires alone exists.

In some embodiments, each of the second etching areas extending along the second direction is disposed at a vertical projection area of an intersection of each of the first electrode wires and each of the first axial wires, and the vertical projection area of the intersection of each of the first electrode wires and each of the first axial wires is projected on the second dummy patterns.

In some embodiments, the second dummy patterns further comprise a plurality of second dummy subpatterns separated by the second etching areas.

In some embodiments, in the second dummy patterns, an area of each of the second dummy subpatterns at least partially overlapping a vertical projection area of the first axial wires is larger than an area of each of the other second dummy subpatterns.

In some embodiments, the each of second etching areas is in a stripe shape, and a width of the stripe shape is from 15 μm to 25 μm.

In some embodiments, the second etching areas extending along the first direction are spaced apart from each other along the second direction, the second etching areas extending along the second direction are spaced apart from each other along the first direction, and a distance between two adjacent second etching areas in the first direction or in the second direction is greater than a width of each of the first axial wires.

In some embodiments, the first electrode wires and the second electrode wires are strip electrode wires.

In some embodiments, a shape of the strip electrode wires comprises a long stripe shape, a sine wave shape, or a curved line shape.

In some embodiments, widths of each of the first electrode wires and each of the second electrode wires are from 300 μm to 500 μm.

In some embodiments, widths of each of the first axial wires and each of the second axial wires are from 150 μm to 250 μm.

In some embodiments, each of the first axial wires is connected to three of the first electrode wires to form a first electrode of the first metal nanowire layer, and each of the second axial wires is connected to three of the second electrode wires to form a second electrode of the second metal nanowire layer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides a detailed description of many different embodiments, or examples, for implementing different features of the provided subject matter. These are, of course, merely examples and are not intended to limit the disclosure but to illustrate it. In addition, various embodiments disclosed below may combine or substitute one embodiment with another, and may have additional embodiments in addition to those described below in a beneficial way without further description or explanation. In the following description, many specific details are set forth to provide a more thorough understanding of the present disclosure. It will be apparent, however, to those skilled in the art, that the present disclosure may be practiced without these specific details.

Further, spatially relative terms, such as "beneath," "over", and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", or "includes" and/or "including", or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this disclosure, the term "merger" in the text means including the merger of various situations, such as partial merger, full merger, discontinuous merger, etc. For example, the original etching line between two adjacent patterns is not etched, showing that the appearance of the two patterns is merged; the original etching line can also be partially etched, showing that the appearance of the two patterns is partially merged; the original etching line can also be partially discontinuous etching, showing that the appearance of the two patterns is discontinuously merged, etc.

A number of examples are provided herein to elaborate upon the touch panel of the instant disclosure. However, the examples are for demonstration purpose alone, and the instant disclosure is not limited thereto.

Figure 1:
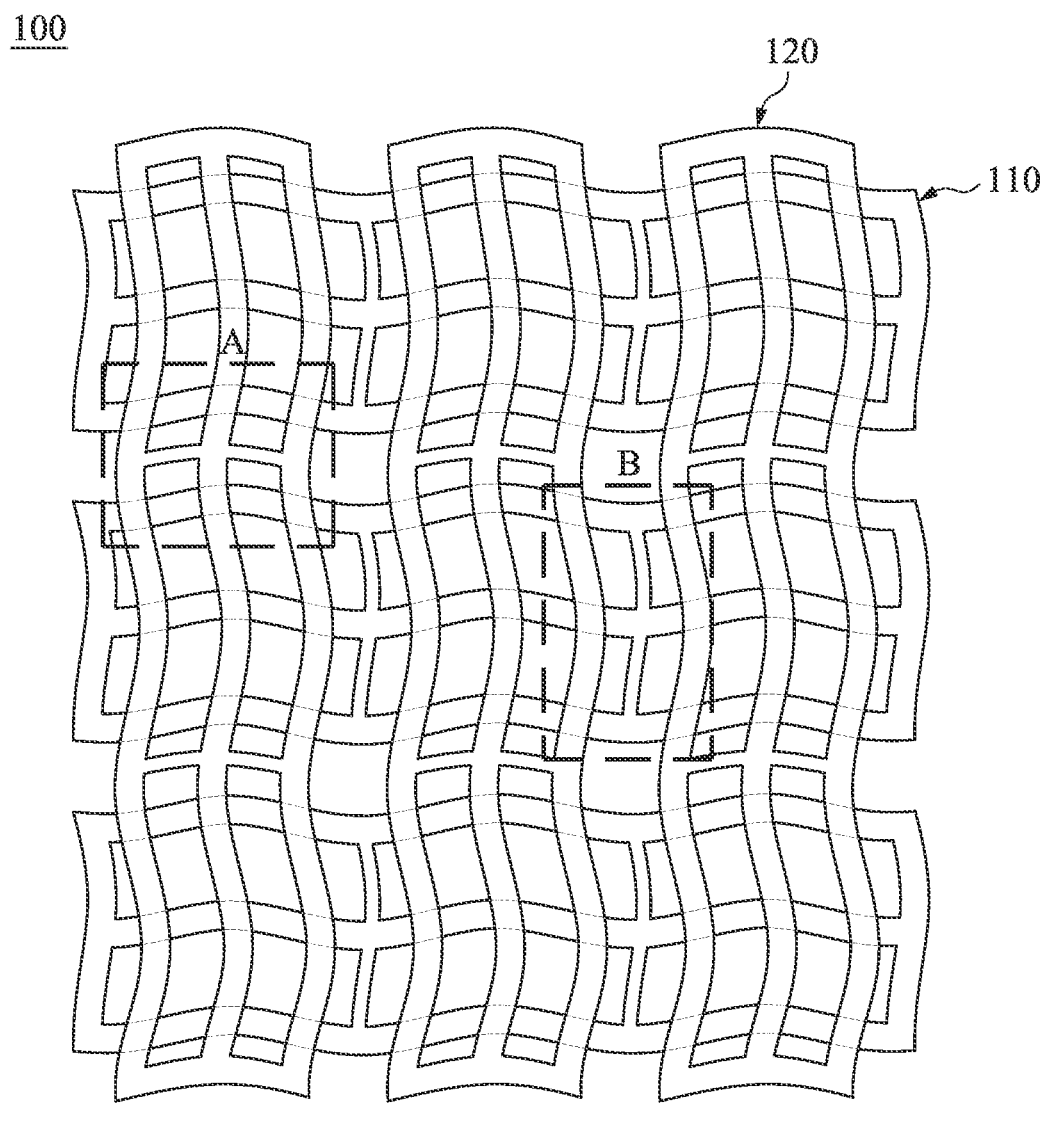
FIG. 1 depicts a plan view of a touch panel according to one embodiment of the present disclosure.
Figure 1:
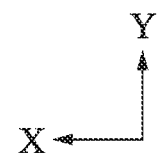

FIG. 1 depicts a plan view of a touch panel according to one embodiment of the present disclosure. The touch panel 100 of this embodiment has a double electrode layers structure, including a first metal nanowire layer 110 and a second metal nanowire layer 120. In addition, the touch panel 100 further includes a substrate. In this embodiment, part of the substrate is omitted and not shown in order to make the pattern of the electrode layer more clearly presented. In some embodiments, the first metal nanowire layer 110 and the second metal nanowire layer 120 are respectively disposed on opposite sides of the substrate; while in other embodiments, the first metal nanowire layer 110 and the second metal nanowire layer 120 may be disposed on the substrate at the same side, and the first metal nanowire layer 110 and the second metal nanowire layer 120 are electrically insulated by an insulating layer. The above-mentioned first metal nanowire layer 110 and second metal nanowire layer 120 are electrically insulated and disposed through the substrate or the insulating layer. The positional relationship between upper and lower layers of the first metal nanowire layer 110 and the second metal nanowire layer 120 is not limited by this disclosure, and can be adjusted according to actual design requirements.

In some embodiments, the above-mentioned substrate is ideally a transparent substrate. Specifically, it may be a rigid transparent substrate or a flexible transparent substrate. The material may be selected from glass, acrylic (polymethylmethacrylate; PMMA), polyvinyl chloride (PVC), polypropylene (PP), polyethylene terephthalate (PET), polyethylene naphthalate (PEN), polycarbonate (PC), polystyrene (PS), polyimide (PI), cyclo-olefin polymers (COP), or other transparent materials.

Figure 2:
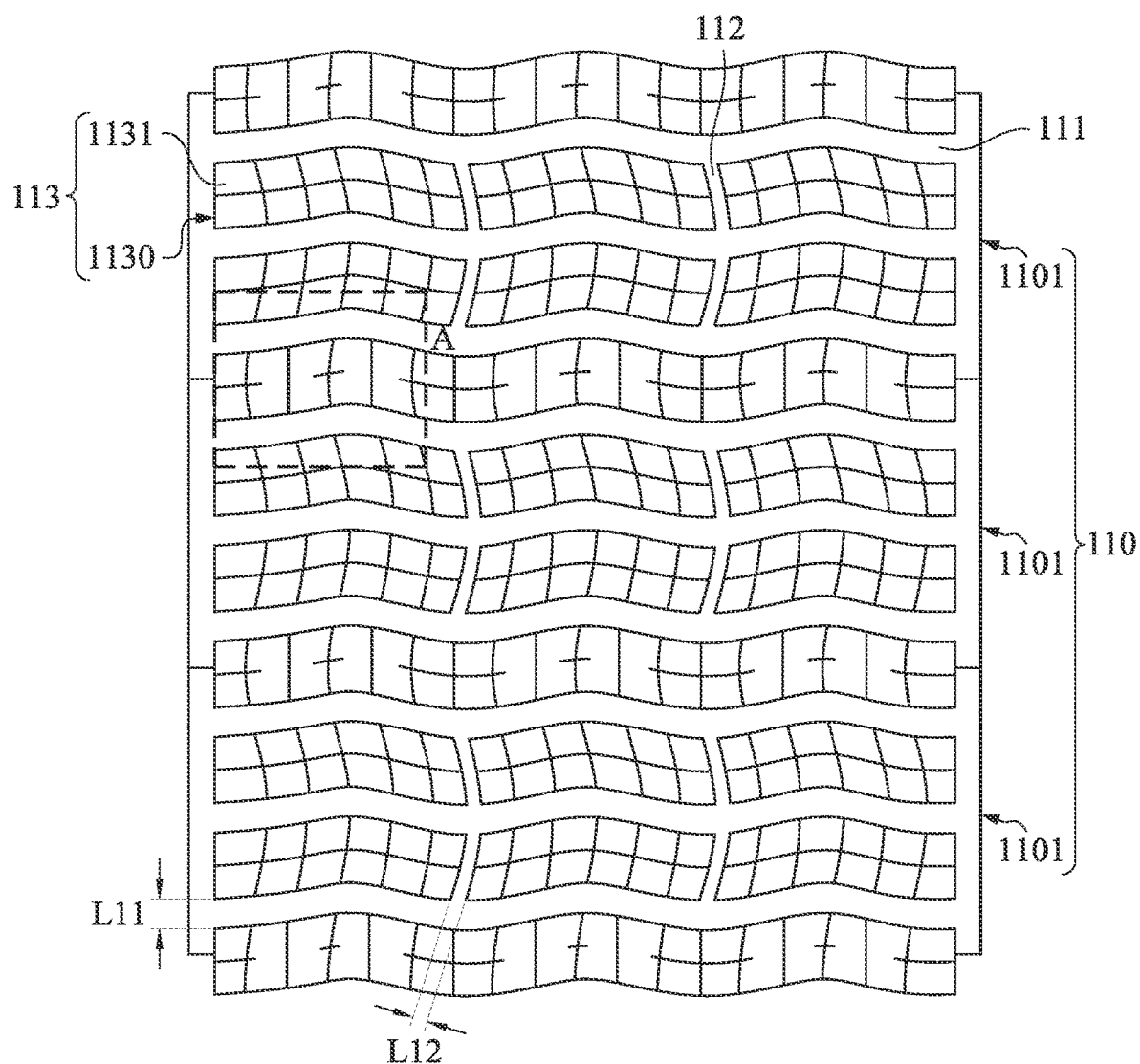
FIG. 2 depicts a schematic view of a first metal nanowire layer according to one embodiment of the present disclosure.
Figure 2:
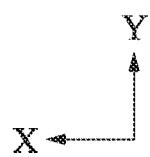
Figure 3:
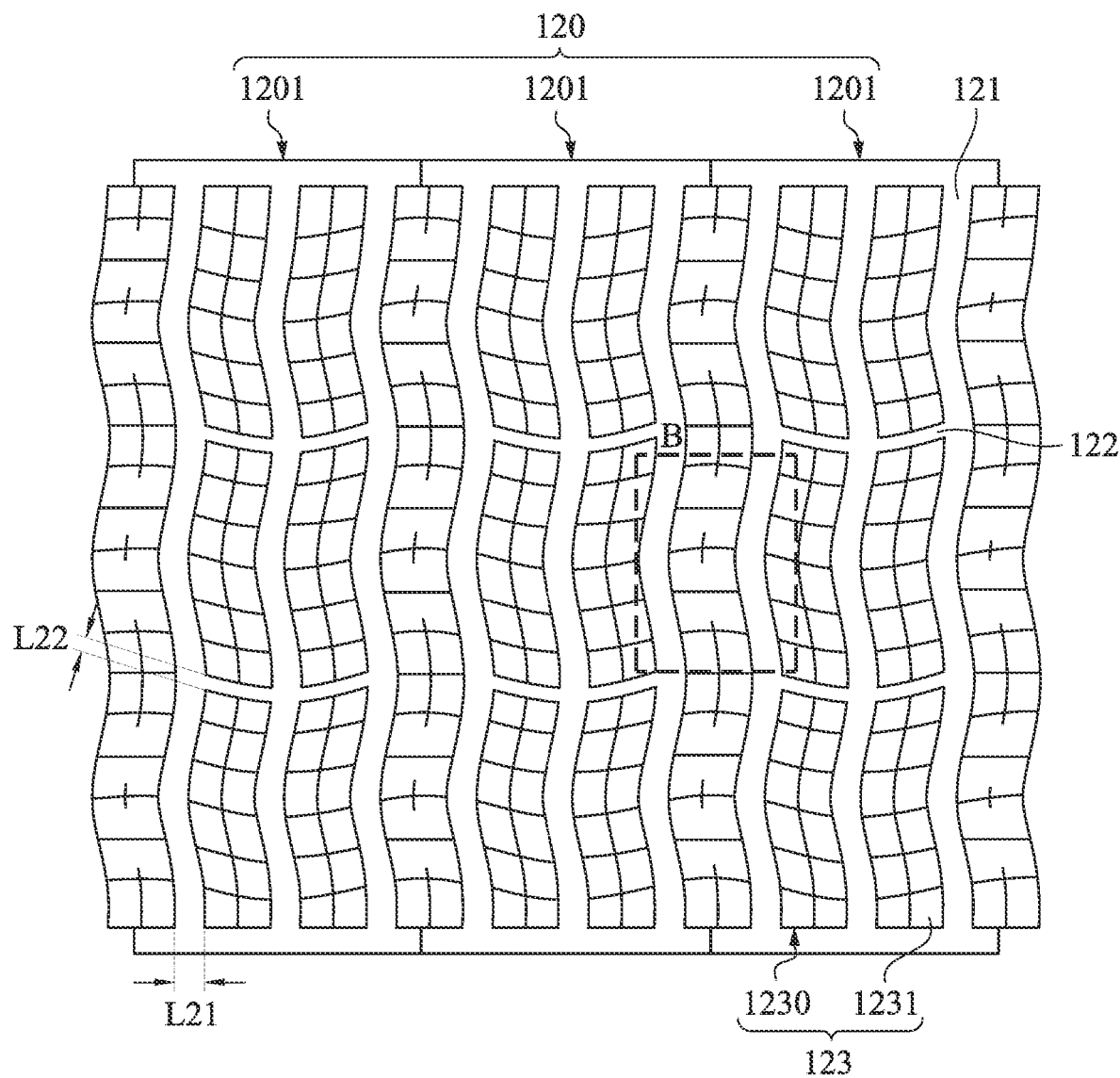
FIG. 3 depicts a schematic view of a second metal nanowire layer according to one embodiment of the present disclosure.

Please refer to FIGS. 2 and 3 at the same time. FIG. 2 depicts a schematic view of a first metal nanowire layer 110 according to one embodiment of the present disclosure, and FIG. 3 depicts a schematic view of a second metal nanowire layer 120 according to one embodiment of the present disclosure. The first metal nanowire layer 110 comprises a plurality of first electrode wires 111, a plurality of first axial wires 112, and a plurality of first dummy patterns 113. The first electrode wires 111 extend along first direction and are spaced apart from each other along a second direction. In this embodiment, the first direction is, for example, the X axis direction, the second direction is, for example, the Y axis direction, and the first direction is perpendicular to the second direction. The first axial wires 112 extend along the second direction and are spaced apart from each other along the first direction, so that each of the first axial wires 112 is connected to the plurality of first electrode wires 111.

In this embodiment, two adjacent first electrode wires 111 are separated from each other by a predetermined distance. Specifically, two adjacent first electrode wires 111 are separated from each other by about 0.8 mm to about 1.7 mm. In one embodiment, a line width L11 of each of the first electrode wires 111 is from 300 µm to 500 µm. In some examples, the line width L11 is about 300 µm, about 320 µm, about 340 µm, about 360 µm, about 380 µm, about 400 µm, about 420 µm, about 440 µm, about 460 µm, about 480 µm, about 500 µm, or any value between any two of these values. In one embodiment, a line width L12 of each of the first axial wires 112 is from 150 µm to 250 µm. In some examples, the line width L12 is about 150 µm, about 170 µm, about 200 µm, about 230 µm, about 250 µm, or any value between any two of these values.

In addition, each of the first axial wires 112 in this embodiment, for example, is connected to three of the first electrode wires 111 to form one first electrode 1101 representing the X-axis electrode in the first metal nanowire layer 110. In other words, the first metal nanowire layer 110 includes a plurality of first electrodes 1101, each of the first electrodes 1101 is a group of three first electrode wires 111, and the first axial wires 112 in each of the first electrodes 1101 are electrically connected to the three first electrode wires 111 in parallel.

The first dummy patterns 113 are electrically insulated and disposed in areas other than the first electrode wires 111 and the first axial wires 112. That is, each of the first dummy patterns 113 is disposed at an area which is between each of the first electrode wires 111 and between each of the first axial wires 112. Each of the first dummy patterns 113 includes a plurality of first etching areas 1130 respectively extending in the first direction and the second direction, and a plurality of first dummy subpatterns 1131 separated by the first etching areas 1130. The first dummy subpatterns 1131 are electrically insulated from each other because of the setting of the first etching areas 1130. In one embodiment, the first etching areas 1130 are in a stripe shape, which is the form of an etching line. The stripe shape may specifically include a curve line and/or a straight line, and a line width of the etching line is from 15 µm to 25 µm. In some examples, the line width is about 15 µm, about 16 µm, about 18 µm, about 20 µm, about 22 µm, about 24 µm, about 25 µm, or any value between any two of these values.

The second metal nanowire layer 120 includes a plurality of second electrode wires 121 and a plurality of second axial wires 122. The second electrode wires 121 extend along the second direction and are spaced apart from each other along the first direction. The second axial wires 122 extend along the first direction and are spaced apart from each other along the second direction, so that each of the second axial wires 122 is connected to the plurality of second electrode wires 121. Similarity, each of the second axial wires 122 in this embodiment, for example, is connected to three of the second electrode wires 121 to form one second electrode 1201 representing the Y-axis electrode in the second metal nanowire layer 120. In other words, the second metal nanowire layer 120 includes a plurality of second electrodes 1201, each of the second electrodes 1201 is a group of three second electrode wires 121, and the second axial wires 122 in each of the second electrodes 1201 are electrically connected to the three second electrode wires 121 in parallel.

In this embodiment, two adjacent second electrode wires 121 are separated from each other by a predetermined distance. Specifically, two adjacent second electrode wires 121 are separated from each other by about 0.8 mm to about 1.7 mm. In one embodiment, a line width L21 of each of the second electrode wires 121 is from 300 µm to 500 µm. In some examples, the line width L21 is about 300 µm, about 320 µm, about 340 µm, about 360 µm, about 380 µm, about 400 µm, about 420 µm, about 440 µm, about 460 µm, about 480 µm, about 500 µm, or any value between any two of these values. In one embodiment, a line width L22 of each of the second axial wires 122 is from 150 µm to 250 µm. In some examples, the line width L22 is about 150 µm, about 170 µm, about 200 µm, about 230 µm, about 250 µm, or any value between any two of these values.

It should be noted that the line width L22 of each the second axial wires 122 is relatively shorter than the line width L21 of each of the second electrode wires 121. When the first etching areas 1130 (etching lines) along the first direction correspond to vertical projection areas of the second axial wires 122, edges of the first etching areas 1130 (etching lines) and edges of the second axial wires 122 are too close to cause optical visibility. More specifically, from the vertical projection direction of the touch panel, if any area (having at least two edge lines) formed by etching lines is formed between the two edge lines of each of the second axial wires 122 (line width L22), in the range of the line width L22 of each of the second axial wires 122, there will be four edge lines that are relatively close to each other, resulting in optical visibility.

Figure 4:
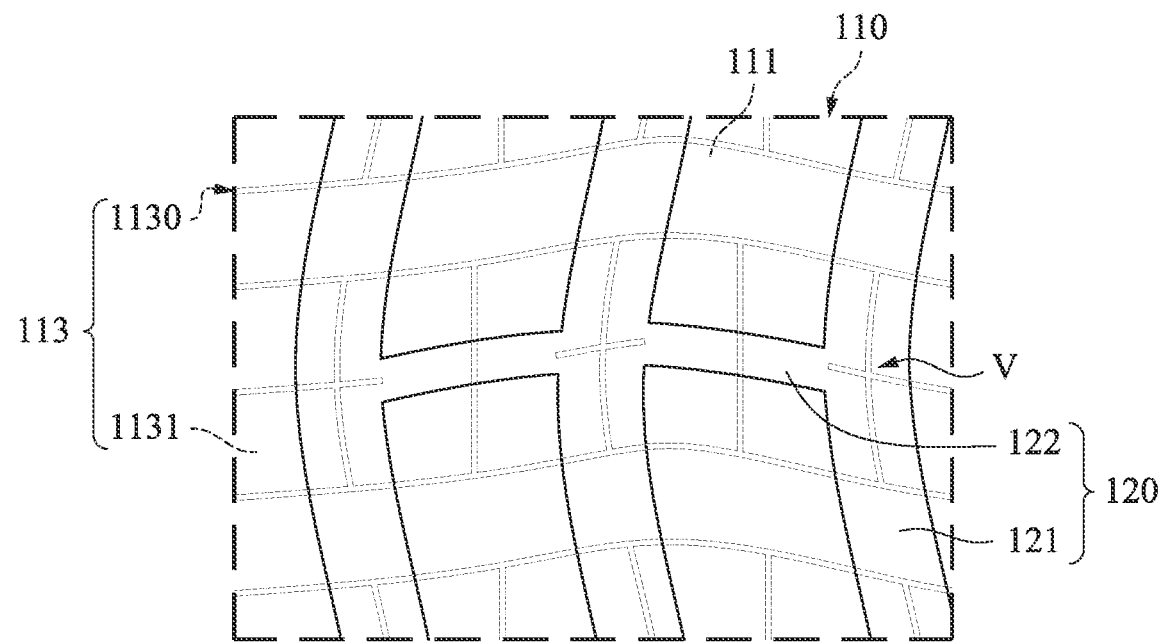
FIG. 4 shows an enlarged schematic view of the dashed box A in FIGS. 1 and 2.
Figure 4:
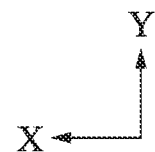

Please refer to FIG. 4, which shows an enlarged schematic view of the dashed box A in FIGS. 1 and 2. In order to avoid the pattern being too complicated and difficult to identify, FIG. 4 only provides the first dummy pattern 113 disposed on the first metal nanowire layer 110 as an example. In fact, it is preferable that the dummy patterns are disposed on both the first metal nanowire layer 110 and the second metal nanowire layer 120. In the embodiment, the first dummy patterns 113 do not expose the first etching areas 1130 along the first direction at a vertical projection area of a part where each of the second axial wires 122 alone exists. It should be noted that in the first dummy patterns 113, the first etching areas 1130 (etching lines) are respectively extended along the first direction and the second direction and spaced apart from each other along the other direction (the second direction and the first direction). The distance between two adjacent first etching areas 1130 (etching lines) in the first direction or the second direction is greater than the line width L22 of each of the second axial wires 122. In one embodiment, it is assumed that the first and second directions are arranged at equal intervals. If the first etching areas 1130 (etching lines) between two adjacent first dummy subpatterns 1131 arranged in the second direction overlap the second axial wires 122 in the vertical projection direction, the two adjacent first dummy subpatterns 1131 are merged. Thus, among the first dummy subpatterns 1131 of the first metal nanowire layer 110, the area of each of the first dummy subpatterns 1131 at least partially overlapping the second axial wires 122 in the vertical projection direction is larger than that of each of the other first dummy subpatterns 1131 which does not overlap the second axial wires 122 in the vertical projection direction.

Next, for the design of intersections V of the second electrode wires 121 and the second axial wires 122, since each of the second axial wires 122 at each of intersections V has one of the second electrode wires 121 extending in the second direction, each the second axial wires 122 at each of the intersections V does not constitute the etching edge. That is, the first etching areas 1130 (etching lines) disposed at the intersections V do not have a problem concerning the distance between etching lines and the edge of the second axial wires 122. Therefore, in some embodiments, the vertical projection area of the first dummy pattern 113 at the intersection of the second electrode wire 121 and the second axial wires 122 may be disposed with the first etching area 1130 (etching lines) extending in the first direction.

In addition, the first electrode wires 111 and the second electrode wires 121 of this embodiment are, for example, strip electrode wires which are similar to electrode wires. A shape of strip electrode wires comprises a long stripe shape, a sine wave shape, or a curved line shape. Furthermore, the first direction in this embodiment refers to the generalized X-axis direction, and the second direction refers to the generalized Y-axis direction. Thus, the sine wave shape or the curved line shape of the electrode lines can be determined from the direction of its center line. In order to reduce the visibility of the electrode pattern of the touch panel 100 and to improve the bending ability of the metal nanowire layer, the first electrode wires 111 and the second electrode wires 121 are preferably designed to have the strip electrode wires with sine wave shape depicted in this embodiment, that is, the so-called S-shaped electrode wires. In addition, the design of the first axial wires 112 and the second axial wires 122 are to enhance the structural integrity of the first metal nanowire layer 110 and the second metal nanowire layer 120. When at least one of the first electrode wires 111 in the first electrode 1101 or at least one of the second electrode wires 121 in the second electrode 1201 is broken, the impedance value of the first electrode 1101 and/or the second electrode 1201 can be prevented from being abnormally increased and the functionality of the touch panel can be maintained.

Please refer to FIG. 3 again. In order to reduce the visibility of the touch electrodes of the touch panel, it is preferable to provide dummy patterns on both the first metal nanowire layer 110 and the second metal nanowire layer 120. Thus, in one embodiment, the second metal nanowire layer 120 further comprises second dummy patterns 123. The design of the second dummy patterns 123 is almost the same as the design of the first dummy patterns 113, the only difference is that the first dummy patterns 113 and second dummy patterns 123 are designed for different electrodes.

The second dummy patterns 123 are electrically insulated and disposed in areas other than the second electrode wires 121 and the second axial wires 122. That is, each of the second dummy patterns 123 is disposed at an area which is between each of the second electrode wires 121 and between each of the second axial wires 122. Each of the second dummy patterns 123 includes a plurality of second etching areas 1230 respectively extending in the first direction and the second direction, and a plurality of second dummy subpatterns 1231 separated by the second etching areas 1230. The second dummy subpatterns 1231 are electrically insulated from each other because of the setting of the second etching areas 1230. In one embodiment, the second etching areas 1230 are in a stripe shape which is the form of the etching line. The stripe shape may specifically include a curve line and/or a straight line, and a line width of the etching line is from 15 µm to 25 µm. In some examples, the line width is about 15 µm, about 16 µm, about 18 µm, about 20 µm, about 22 µm, about 24 µm, about 25 µm, or any value between any two of these values.

Figure 5:
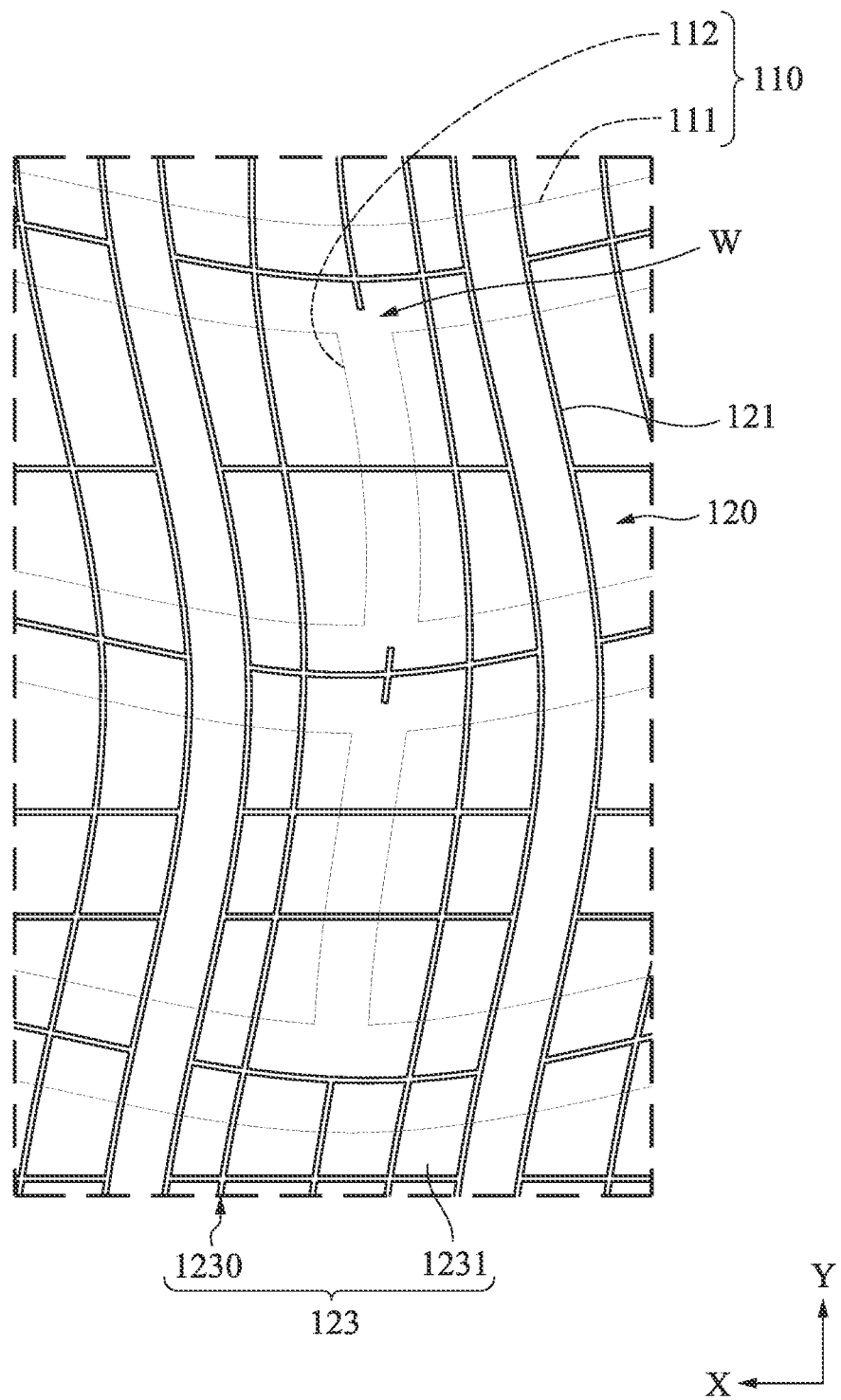
FIG. 5 shows an enlarged schematic view of the dashed box B in FIGS. 1 and 3.

In addition, please refer to FIG. 5 again, which shows an enlarged schematic view of the dashed box B in FIGS. 1 and 3. In order to avoid the pattern being too complicated and difficult to identify, FIG. 5 only provides the second dummy pattern 123 disposed on the second metal nanowire layer 120 as an example. In fact, it is preferable that the dummy patterns are disposed on both the first metal nanowire layer 110 and the second metal nanowire layer 120. In the embodiment, the second dummy patterns 123 do not expose the second etching areas 1230 along the second direction at a vertical projection area of a part where each of the first axial wires 112 alone exists. In addition, in the second dummy patterns 123, the second etching areas 1230 (etching lines) are respectively extended along the first direction and the second direction and spaced apart from each other along the other direction (the second direction and the first direction). The distance between two adjacent second etching areas 1230 (etching lines) in the first direction or the second direction is greater than the line width L12 of each of the first axial wires 112. Thus, among the second dummy subpatterns 1231 of the second metal nanowire layer 120, the area of each of the second dummy subpatterns 1231 at least partially overlapping the first axial wires 112 in the vertical projection direction is larger than that of each of the other second dummy subpatterns 1231 which does not overlap the first axial wires 112 in the vertical projection direction.

Next, for the design of intersections W of the first electrode wires 111 and the first axial wires 112, since each of the first axial wires 112 at each of intersections W has one of the first electrode wires 111 extending in the first direction, each the first axial wires 112 at each of the intersections W does not constitute the etching edge. That is, the second etching areas 1230 (etching lines) disposed at the intersections W do not have a problem concerning the distance between etching lines and the edge of the first axial wires 112. Therefore, in some embodiments, the vertical projection area of the second dummy pattern 123 at the intersection of the first electrode wire 111 and the first axial wires 112 may be disposed with the second etching area 1230 (etching lines) extending in the second direction.

Next, the specific manufacturing methods of the first metal nanowire layer 110 and the second metal nanowire layer 120 are further described. The manufacturing methods of the two layers are the same, and only the first metal nanowire layer 110 is used as a representative description below. The first metal nanowire layer 110 is formed by the steps of coating, drying/curing, and patterning of a dispersion or a slurry including metal nanowires.

The coating steps are for example but not limitation: screen printing, nozzle coating, roller coating, and other processes. In one embodiment, a roll to roll process is used to coat the dispersion or slurry including metal nanowires on the surface of the continuously supplied substrate. The dispersion with metal nanowires is a solvent, such as water, alcohol, ketone, ether, hydrocarbon, or aromatic solvent (benzene, toluene, xylene, etc.).

The above-mentioned dispersion liquid may also include additives, surfactants, or binders, such as carboxymethyl cellulose (CMC), 2-hydroxyethyl cellulose (HEC), hydroxypropyl methyl cellulose (HPMC), sulfonate, sulfate, disulfonate, sulfosuccinate, phosphate ester, fluorinated surfactant (or per- and polyfluoroalkyl substances (PFASs)), etc.

The metal nanowires layer, for example, may include a silver nanowires layer, a gold nanowires layer, or a copper nanowires layer. In more specifically, "metal nanowires" as used herein is a collective noun, which refers to a collection of metal wires including multiple element metals, metal alloys, or metal compounds (including metal oxides), in which the number of metal nanowires included does not affect the scope of protection claimed by the present disclosure. At least one cross-sectional dimension (i.e. the diameter of the cross-section) of a single metal nanowire is less than 500 nm, preferably less than 100 nm, and more preferably less than 50 nm. The metal nanostructure called "wire" in the present disclosure mainly has a high aspect ratio, for example, from 10 to 100,000. In more specifically, the aspect ratio (length to diameter of the cross section) of the metal nanowires can be greater than 10, preferably greater than 50, and more preferably greater than 100. The metal nanowires can be any metal, including (but not limited to) silver, gold, copper, nickel, and gold-plated silver. Other terms, such as silk, fiber, tube, etc., if they also have the above-mentioned size and high aspect ratio, are also covered by the present disclosure.

In some embodiments, the metal nanowires can be silver nanowires or silver nanofibers, which can have an average diameter of about 20 to 100 nm, and an average length of about 20 to 100 μm. Preferably, the average diameter is about 20 to 70 nm, and the average length is about 20 to 70 μm (that is, an aspect ratio of 1000). In one embodiment, the diameter of the metal nanowires is from 70 nm to 80 nm, and the length is about 8 μm.

The solvents and other substances are volatilized in the curing/drying step, so that the metal nanowires are randomly distributed on the surface of the substrate. Preferably, the metal nanowires are fixed on the surface of the substrate without peeling off to form the first metal nanowire layer 110, and the metal nanowires contact each other to provide a continuous current path, thereby forming a conductive network.

In addition, in some embodiments, an overcoat is disposed on the first metal nanowire layer 110 to form an overcoat layer. After curing, the overcoat layer and the first metal nanowire layer 110 define a composite structure layer. In one embodiment, suitable polymers or their mixtures are formed on the first metal nanowire layer 110 by a coating method. The polymers penetrate between the metal nanowires to form a filler, and the curing step is applied to form the overcoat layer. In other words, the metal nanowires can be regarded as embedded in the overcoat layer. In a specific embodiment, the curing step is: forming the overcoat layer on the first metal nanowire layer 110 with the above-mentioned polymers or mixtures of polymers by a heating process (at a temperature from about 60° C. to about 150° C.). The present disclosure does not limit the physical structure between the overcoat layer and the first metal nanowire layer 110. For example, the overcoat layer and the first metal nanowire layer 110 can be a stack of two layers, or the overcoat layer and the first metal nanowire layer 110 can be combined to form a composite layer. Preferably, the metal nanowires are embedded in the overcoat layer to form a composite pattern, and the composite pattern is patterned in the subsequent manufacturing process. The above-mentioned polymers can provide certain specific chemical, mechanical, and optical properties to the metal nanowires, such as providing adhesion between the metal nanowires and the substrate or providing better physical mechanical strength, so the overcoat layer is also called a matrix. On the other hand, some specific polymers are used to make the overcoat layer, so that the metal nanowires have additional surface protection against scratches and abrasion. Specific polymers, such as polyacrylate, epoxy resin, polyurethane, polysiloxane, polysiloxane, poly(silicon-acrylic acid), etc. can be used so that the metal nanowires have higher surface strength to improve scratch resistance. Furthermore, cross-linking agents, polymerization inhibitors, stabilizers (for example, but not limitation antioxidants, ultraviolet (UV) stabilizers), surfactants, or the above-mentioned analogs or mixtures can be added to the aforementioned polymers to improve the UV resistance of the composite structure or to achieve a longer shelf life of the composite structure.

In addition, the aforementioned metal nanowires are further subjected to post-processing to increase conductivity of the metal nanowires. The post-processing can include process steps such as heating, plasma discharge, corona discharge, applying UV ozone, or applying pressure. For example, after the curing to form the first metal nanowire layer 110, a roller can be used to apply pressure on the first metal nanowire layer 110. In one example, a pressure of 50 to 3400 psi is applied to the first metal nanowire layer 110 by one or more rollers; preferably, a pressure of 100 to 1000 psi, 200 to 800 psi, or 300 to 500 psi may be applied. In some embodiments, heating and applying pressure of the post-processing can be performed at the same time. Specifically, Pressure can be applied to the formed metal nanowires through one or more rollers as described above and heated at the same time. For example, a pressure of 10 to 500 psi can be applied to the metal nanowires by rollers, preferably, 40 to 100 psi; at the same time, the rollers can be heated from about 70° C. to 200° C., preferably, from about 100° C. to 175° C., which can improve the conductivity of the first metal nanowire layer 110. In some embodiments, the metal nanowires are preferably exposed to a reducing agent for the post-processing. For example, metal nanowires including silver nanowires are preferably exposed to a silver reducing agent for the post-processing. The silver reducing agent includes borohydrides, such as sodium borohydride; boron nitrogen compounds, such as dimethylaminoborane (DMAB); or gaseous reducing agents, such as hydrogen ($H_2$). The exposure time can be about 10 seconds to about 30 minutes, preferably about 1 minute to about 10 minutes. The above steps of applying pressure can be added in appropriate steps according to actual needs.

Finally, the patterning step is, for example, exposing/developing/etching (i.e., a well-known lithography process) the cured first metal nanowire layer 110 to form patterns of the first electrode 1101 and the first dummy pattern 113. In one embodiment, the first metal nanowire layer 110 preferably has the following characteristics: a transmission of visible light (for example, the wavelength is from about 400 nm to 700 nm) may be greater than about 80%, and the surface resistance is from about 10 to 1000 ohm/square; preferably, the visible light (for example, the wavelength is from about 400 nm to 700 nm) of the first metal nanowire layer 110 has a transmission greater than about 85%, and the surface resistance is from about 50 to 500 ohms/square.

In some embodiments of the present disclosure, the touch panel having dummy pattern can be used as the touch sensing film in a touch display device (not shown). The touch sensing film is located on a liquid crystal display module, and a glass cover is disposed on the touch sensing film. The touch sensing film, the glass cover, and the liquid crystal display module are respectively bonded with optical adhesive (OCA). Both sides of the touch sensing film may have protective layers, such as protect ink, for protection.

In some embodiments of the present disclosure, in the touch panel with two electrode layers, when the etching area in the dummy pattern of one of the metal nanowire layers in the vertical projection direction at least partially overlaps the axial wires of the other metal nanowire layer, the merge of the dummy patterns will not only reduce the overall visual visibility of the graphics, but also not cause the dense and visible etching lines because of the design of the dummy patterns.

While the disclosure has been described by way of example(s) and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel having dummy pattern, comprising:
   a first metal nanowire layer, comprising:
      a plurality of first electrode wires extending along a first direction and spaced apart from each other along a second direction, wherein the first direction is perpendicular to the second direction;
      a plurality of first axial wires extending along the second direction and spaced apart from each other along the first direction, wherein each of the first axial wires is connected to the first electrode wires; and
      a plurality of first dummy patterns electrically insulated and disposed in areas other than the first electrode wires and the first axial wires, wherein each of the first dummy patterns comprises a plurality of first etching areas respectively extending in the first direction and the second direction and a plurality of first dummy subpatterns separated by the first etching areas; and
   a second metal nanowire layer electrically insulated and disposed above or below the first metal nanowire layer, the second metal nanowire layer comprising:
      a plurality of second electrode wires extending along the second direction and spaced apart from each other along the first direction; and
      a plurality of second axial wires extending along the first direction and spaced apart from each other along the second direction, wherein each of the second axial wires is connected to the second electrode wires;
   wherein the first dummy patterns do not expose the first etching areas along the first direction at a vertical projection area of a part where each of the second axial wires alone exists.

2. The touch panel of claim 1, wherein each of the first etching areas extending along the first direction is disposed at a vertical projection area of an intersection of each of the second electrode wires and each of the second axial wires, and the vertical projection area of the intersection of each of the second electrode wires and each of the second axial wires is projected on the first dummy patterns.

3. The touch panel of claim 1, wherein in the first dummy patterns, an area of each of the first dummy subpatterns at least partially overlapping a vertical projection area of the second axial wires is larger than an area of each of the other first dummy subpatterns.

4. The touch panel of claim 1, wherein each of the first etching areas is in a stripe shape, and a width of the stripe shape is from 15 μm to 25 μm.

5. The touch panel of claim 1, wherein the first etching areas extending along the first direction are spaced apart from each other along the second direction, the first etching areas extending along the second direction are spaced apart from each other along the first direction, and a distance between two adjacent first etching areas in the first direction or in the second direction is greater than a width of each of the second axial wires.

6. The touch panel of claim 1, wherein the second metal nanowire layer comprises a plurality of second dummy patterns electrically insulated and disposed in areas other than the second electrode wires and the second axial wires, and each of the second dummy patterns comprises a plurality of second etching areas respectively extending in the first direction and the second direction.

7. The touch panel of claim 6, wherein the second dummy patterns do not expose the second etching areas along the second direction at a vertical projection area of a part where each of the first axial wires alone exists.

8. The touch panel of claim 7, wherein each of the second etching areas extending along the second direction is disposed at a vertical projection area of an intersection of each of the first electrode wires and each of the first axial wires, and the vertical projection area of the intersection of each of the first electrode wires and each of the first axial wires is projected on the second dummy patterns.

9. The touch panel of claim 7, wherein the second dummy patterns further comprise a plurality of second dummy subpatterns separated by the second etching areas.

10. The touch panel of claim 9, wherein in the second dummy patterns, an area of each of the second dummy subpatterns at least partially overlapping a vertical projection area of the first axial wires is larger than an area of each of the other second dummy subpatterns.

11. The touch panel of claim 6, wherein each of the second etching areas is in a stripe shape, and a width of the stripe shape is from 15 μm to 25 μm.

12. The touch panel of claim 6, wherein the second etching areas extending along the first direction are spaced apart from each other along the second direction, the second etching areas extending along the second direction are spaced apart from each other along the first direction, and a distance between two adjacent second etching areas in the first direction or in the second direction is greater than a width of each of the first axial wires.

13. The touch panel of claim 1, wherein the first electrode wires and the second electrode wires are strip electrode wires.

14. The touch panel of claim 13, wherein a shape of the strip electrode wires comprises a long stripe shape, a sine wave shape, or a curved line shape.

15. The touch panel of claim 1, wherein widths of each of the first electrode wires and each of the second electrode wires are from 300 μm to 500 μm.

16. The touch panel of claim 1, wherein widths of each of the first axial wires and each of the second axial wires are from 150 μm to 250 μm.

17. The touch panel of claim 1, wherein each of the first axial wires is connected to three of the first electrode wires to form a first electrode of the first metal nanowire layer, and each of the second axial wires is connected to three of the second electrode wires to form a second electrode of the second metal nanowire layer.

18. A touch panel having dummy pattern, comprising:
   a first metal nanowire layer, comprising:
      a plurality of first electrode wires extending along a first direction and spaced apart from each other along a second direction, wherein the first direction is perpendicular to the second direction;

a plurality of first axial wires extending along the second direction and spaced apart from each other along the first direction, wherein each of the first axial wires is connected to the first electrode wires; and a plurality of first dummy patterns electrically insulated and disposed in areas other than the first electrode wires and the first axial wires, wherein each of the first dummy patterns comprises a plurality of first etching areas respectively extending in the first direction and the second direction; and a second metal nanowire layer electrically insulated and disposed above or below the first metal nanowire layer, the second metal nanowire layer comprising:

a plurality of second electrode wires extending along the second direction and spaced apart from each other along the first direction; and a plurality of second axial wires extending along the first direction and spaced apart from each other along the second direction, wherein each of the second axial wires is connected to the second electrode wires, wherein:

the first dummy patterns do not expose the first etching areas along the first direction at a vertical projection area of a part where each of the second axial wires alone exists, the first etching areas extending along the first direction are spaced apart from each other along the second direction, the first etching areas extending along the second direction are spaced apart from each other along the first direction, and a distance between two adjacent first etching areas in the first direction or in the second direction is greater than a width of each of the second axial wires.

19. A touch panel having dummy pattern, comprising:

a first metal nanowire layer, comprising:

a plurality of first electrode wires extending along a first direction and spaced apart from each other along a second direction, wherein the first direction is perpendicular to the second direction;

a plurality of first axial wires extending along the second direction and spaced apart from each other along the first direction, wherein each of the first axial wires is connected to the first electrode wires; and a plurality of first dummy patterns electrically insulated and disposed in areas other than the first electrode wires and the first axial wires, wherein each of the first dummy patterns comprises a plurality of first etching areas respectively extending in the first direction and the second direction; and a second metal nanowire layer electrically insulated and disposed above or below the first metal nanowire layer, the second metal nanowire layer comprising:

a plurality of second electrode wires extending along the second direction and spaced apart from each other along the first direction; and a plurality of second axial wires extending along the first direction and spaced apart from each other along the second direction, wherein each of the second axial wires is connected to the second electrode wires, wherein:

the first dummy patterns do not expose the first etching areas along the first direction at a vertical projection area of a part where each of the second axial wires alone exists, and widths of each of the first electrode wires and each of the second electrode wires are from 300 µm to 500 µm.

20. The touch panel of claim 19, wherein the widths of each of the first axial wires and each of the second axial wires are from 150 µm to 250 µm.

* * * * *